United States Patent [19]

Stickler et al.

[11] 3,923,284
[45] Dec. 2, 1975

[54] FAUCET VALVE

[76] Inventors: Ray E. Stickler, 10816 N. Lakeview, Milwaukee, Wis. 53092; Glenn W. Hicks, 2749 N. 75th St., Wauwatosa, Wis. 53210

[22] Filed: Sept. 3, 1974

[21] Appl. No.: 502,542

[52] U.S. Cl. .................................. 251/172; 251/175
[51] Int. Cl.² .......................................... F16K 25/00
[58] Field of Search ........................... 251/172, 175

[56] References Cited
UNITED STATES PATENTS

| | | | |
|---|---|---|---|
| 2,844,353 | 7/1958 | Gurries | 251/175 |
| 3,043,554 | 7/1962 | Garza | 251/175 |
| 3,476,149 | 11/1969 | Doruavs | 251/172 X |

*Primary Examiner*—Harold W. Weakley
*Attorney, Agent, or Firm*—Fred Wiviott

[57] ABSTRACT

A valve assembly including a hollow, generally cylindrical housing having spaced inlet and outlet ports, a generally circular valve member disposed coaxially within the housing between the inlet and outlet ports, and a generally cup-shaped sealing member disposed coaxially within the housing, and having an end surface in sealing engagement with a mating surface on the valve member. The valve member is rotatable about the axis of the housing and has a non-concentric aperture movable upon rotation of the valve member into and out of registry with a non-concentric opening in the sealing member.

12 Claims, 4 Drawing Figures

FAUCET VALVE

BACKGROUND OF THE INVENTION

This invention relates to faucet valves.

One type of commonly used faucet has separate valves for hot and cold water lines and coupled to a common spout. Valves of this type generally include a washer mounted on a valve stem which is movable into and out of engagement with a valve seat. Such washers are inherently subject to wear and deformation as a result of the compression of the washer against the valve seat. One type of a prior art faucet valve designed to eliminate the inherent deficiencies of compression type valves includes a valve element having a generally planer surface disposed in sliding engagement with a corresponding planer surface in the valve housing and wherein a non-concentric opening through the valve member is movable into and out of registry with a corresponding opening in the planer housing surface. Such prior art faucet assemblies also included a generally cup-shaped seal disposed between the opening in the planer housing surface and the housing inlet, and which was received within a counter-sunk opening and biased into closed position by means of a spring. While such prior art faucet assemblies effectively minimized seal wear, the nonconcentric opening in the planer faucet surface and the opening for the cup-shaped seal member required expensive machine operations and in addition the seal biasing spring tended to be noisy as a result of water flow therethrough.

SUMMARY OF THE INVENTION

It is an object of the invention to provide a new and improved faucet valve of the non-compression type.

Another object of the invention is to provide a non-compression type faucet valve which does not require a sealing member biasing spring.

A still further object of the invention is to provide a faucet valve wherein machining operations are minimized.

These and other objects and advantages of the present invention will become more apparent from the detailed description thereof taken with the accompanying drawings.

The foregoing and other objects of the invention are accomplished by means of a valve assembly including a hollow housing for enclosing a rotatable valve member disposed between spaced inlet and outlet ports, and a sealing member disposed coaxially within the housing and having an end surface in sealing engagement with a mating surface on the valve member. The valve member and the sealing member have openings which are non-concentric with the valve member's rotational axis and the aperture in the valve member is movable into and out of registry with the opening in the sealing member whereby the sealing member is biased toward engagement with the valve member under the influence of normal water pressure.

DESCRIPTION OF THE PREFERRED EMBODIMENT

Figure 1:
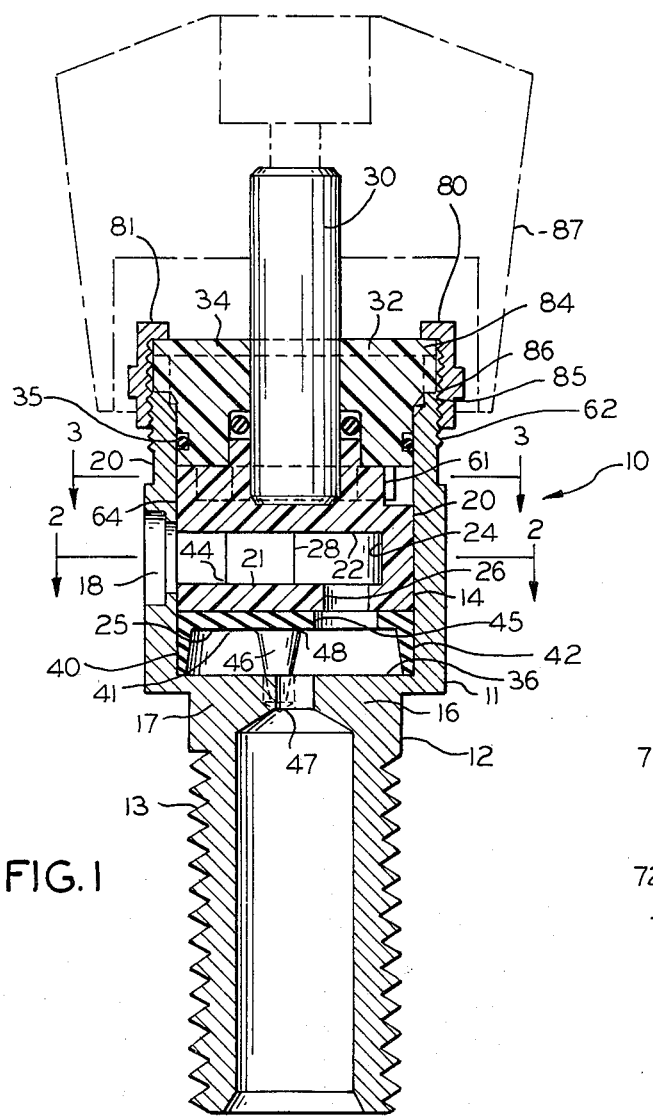
FIG. 1, is a side elevational view, partly in section, of a faucet valve assembly according to the present invention.

The faucet valve 10 according to the preferred embodiment of the invention is shown in FIG. 1 to include a generally cylindrical valve body 11 and a coaxial inlet portion 12 of reduced diameter and which has external threads 13 for connection in a conventional matter to either a hot or cold water line (not shown). The body portion 11 has an internal cylindrical bore 14 which is connected at its lower end to its inlet portion 12 by means of a concentric inlet opening 16 formed in the base 17 of body 11. In addition, an exit opening 18 is formed in one side of the housing with the axes of openings 16 and 18 intersecting at an angle of approximately 90°.

A valve member 20 is disposed within the body portion 11 and is generally defined by upper and lower generally disclike portions 21 and 22, respectively, which are spaced apart in a generally parallel relation and are interconnected by means of an axially extending web portion 24 which is generally C-shaped in transverse cross-section. The lower portion 21 of valve member 20 has a generally planer lower surface 25 and a generally kidneyshaped aperture 26 formed therethrough and spaced laterally from the axis 28 about which the valve member 20 is rotatable. The upper portion 22 of valve member 20 is imperforate and has the lower end of a valve stem 30 embedded in its upper end.

A closure 32 may be disposed in the upper end of the bore 14 of housing 11 in surrounding relation to stem 30 and above valve member 20. Suitable seals, such as O-rings 34 and 35, may be disposed between member 32 and the stem 30 and housing 11, respectively, for sealing the upper end of housing 11.

Figure 2:
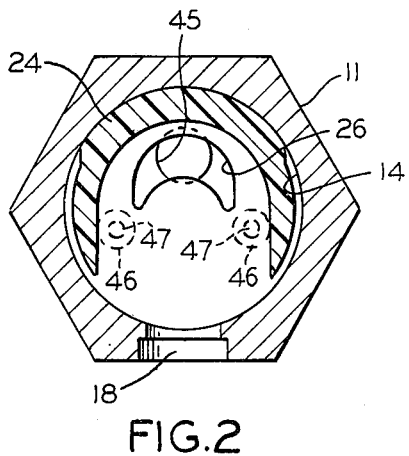
FIG. 2, is a view taken along lines 2—2 of FIG. 1.

The lower surface 25 of the valve member 20 is spaced from the lower surface 36 of bore 14 to form a gap in which a resilient, generally cup-shaped sealing member 40 is disposed. Member 40 includes a generally circular base portion 41 whose outer diameter is substantially equal to the internal diameter of the bore 14 and is disposed in a generally coaxial relation therewith. In addition, member 40 includes an annular skirt portion 42 extending downwardly from the outer periphery of base portion 41 and in sealing engagement with the surface of bore 14. The upper surface 44 of sealing member 40 is generally planer and complimentary with the lower surface of 25, the valve member 20. In addition, a generally circular aperture 45 is formed through base portion 41 of sealing member 40 and the axis of aperture 45 is offset from the rotational axis 28 of valve member 20 by substantially the same distance as the aperture 26 in portion 21 of said valve member. As seen in FIGS. 1 and 2, a pair of integral locating columns 46 extend downwardly from the lower surface of base portion 41 and each is received in one of a pair of parallel holes 47 and formed in lower surface 36 of housing 11. As seen in FIG. 2, the columns 46 and the holes 47 both lie on one side of a plane containing the axis of bore 14 so that the columns 46 will mate with holes 47 only when the seal 40 is oriented properly with respect to valve member 20. In addition, columns 46 serve to support for the base of said sealing member 40.

Figure 3:
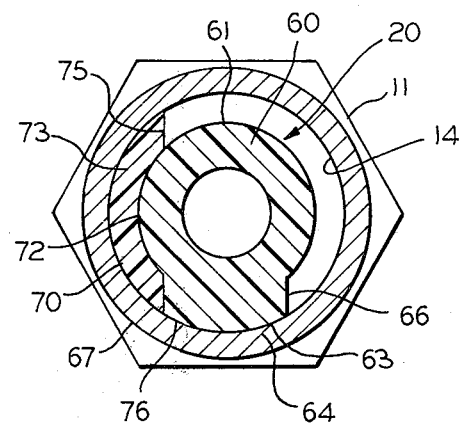
FIG. 3, is a view taken along lines 3—3 of FIG. 1.

As seen in FIGS. 1 and 3, the upper end 60 of valve member 20 has a generally cylindrical outside surface 61 which is coaxial with bore 14 and, except for an enlarged portion 63, has a diameter which is reduced with respect to the said bore. The enlarged portion 63 of the valve member's upper end 60 has an outer surface 64 which engages and is complimentary with the intersurface of bore 14. The sides of the enlarged portions 63 are defined by generally parallel cordal surfaces 66 and 67. In addition, the lower end of closure member 61 has a downwardly extending crescent shaped annular section 70 whose inner and outer surfaces 72 and 73 respectively correspond to the surface 61 of valve member 20 and the surface of bore 14 and lies therebetween. The opposite ends of section 70 is defined by generally co-planer cordal surfaces 75 and 76. It will thus be appreciated that the degree of angular rotation of valve member 20 will be limited by the engagement between surface 67 of valve member 20 with surface 76 of closure member 70 and rotation in the opposite direction will be limited by engagement between surface 66 and surface 75.

The closure member 32 may be suitable affixed within the bore 14 in any suitable manner such as by means of an internally threaded ring 80 which has an inwardly extending flange 80 which engages on the upper surface of member 32 and which is suitably threaded on external threads 82 formed at the upper end of housing 11. In addition, the member 32 has an outwardly extending flange portion 84 which engages the upper end of housing 11. Member 32 may be angularly located in any suitable manner such as by an integral lug 85 which is received with a notch 86 formed in housing 11. A suitable handle 87 may be secured in a conventional manner to the upper end of valve stem 30. It will be appreciated by those skilled in the art that the lower end of inlet portion 12 will be suitably connected into a hot or cold water line while the opening 18 in housing 11 will be connected in a suitable manner to a common discharge spout of conventional construction which is similarly connected to a similar valve assembly which is connected within the outer water line. When the valve member 26 is in its position shown in FIGS. 1-3, the opening 20 will be in registry with opening 45 in sealing member 40 in which event the water will flow upwardly through inlet 12, opening 16, below member 40, through openings 45 and 26, into the gap between the portions 21 and 22 of valve member 20 and outwardly through opening 18. When the valve member 20 is rotated approximately 180° from its position shown in FIGS. 1, 2 and 3 wherein the surface 66 will engage in surface 75 as seen in FIG. 3, the opening 26 will be out of registry with the opening 45 and water flow will be prevented. In the latter event, the water pressure below the flexible sealing member 40 will urge the latter upwardly so that the surface 44 sealingly engages the surface 45 of valve member 20 and in addition the outer surface of the skirt portion 42 will sealingly engage the bore 14 of housing 11. As a result, water flow will be prevented. It can also be seen in FIG. 2 that when the openings 26 and 45 are in registry, the gap between valve portions 21 and 22 communicates with opening 18. The periphery of web portion 24 is recessed at 88 and 89 so that as valve 20 is rotated 180° counterclockwise as seen in FIG. 2, communication between said gap and opening 18 will continue to exist while the openings are in partial registry.

While the openings 26 and 45 may take any convenient shape, the kidney-shaped opening 26 illustrated in FIG. 2 provides a metering action as the opening area moves across the circular opening 45 and out of registry therewith.

Figure 4:
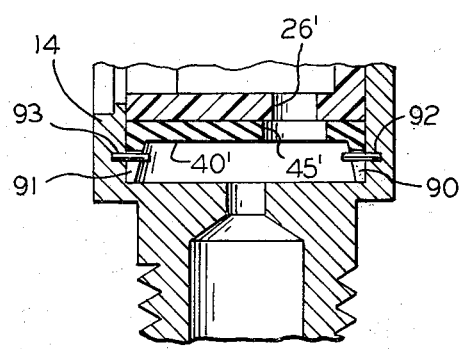
FIG. 4 is a fragmentary sectional view of an alternate embodiment of the invention.

FIG. 4 shows alternate embodiment of the present invention wherein the flexible sealing member 40' is provided with a pair of axially extending slots 90 and 91 formed in its opposite sides. In addition a pair of pins 92 and 93 extend in a radial direction inwardly from the surface of bore 14 and through slots 90 and 91, respectively. Preferably, slot 90 is deeper than slot 91 and pin 92 is at a higher elevation than in 93 so that the sealing member 45 cannot be inserted in a reversed position to insure that the openings 26' and 45' will be in their desired angular relationship.

Those skilled in the art will appreciate that the components of the faucet valve according to the present invention may be fabricated from conventional materials. For example, the housing 11, inlet 12 and stem 30 may be brass, the valve member 20 and closure member 32 may be a suitable plastic and the sealing member of a suitable rubber or artificial composition commonly employed for flexible seals.

While only few embodiments of the present invention have been shown and described it is intended to be limited thereby but only by the scope of the appended claims.

We claim:

1. A valve assembly including a housing defining a hollow chamber, inlet and outlet ports formed in spaced apart relation within said chamber, rotatable valve means disposed within said chamber and between said inlet and outlet ports, and a flexible sealing member disposed within said housing and extending across said chamber, said sealing member being spaced from said inlet opening and being disposed between said inlet opening and said valve means for sealing said inlet opening from said outlet opening, a first opening formed in said valve means and offset from the rotational axis of said valve means, a second opening formed in said sealing member and offset from the rotational axis of said valve means, said valve means and said sealing member having complimentary engageable surfaces to provide a seal therebetween under the influence of water pressure when said openings are out of registry, said valve means being rotatable to move said first opening into and out of registry with said second opening.

2. The assembly set forth in claim 1 wherein said chamber is generally cylindrical, said valve means extending across said chamber and is rotatable about an axis coincident with the axis of said chamber, said sealing member extending across said chamber in general registry with said valve means.

3. The assembly set forth in claim 2 wherein said complimentary surfaces are generally circular, coaxial and have substantially the same diameter, said surfaces being generally normal to the axis of said chamber.

4. The assembly set forth in claim 3 wherein said sealing member is generally cup-shaped and has a planer base portion engaging said valve means and a skirt portion extending toward said inlet opening from the periphery of the base portion and engaging the walls of said housing, said second opening being formed in said base portion.

5. The assembly set forth in claim 4 wherein said valve means has a recess formed therein and communicating with said first openings, stop means disposed in said housing for limiting the rotational movement of said valve means between a first position wherein said first opening is in registry with said second opening and a second position wherein said openings are out of registry, said recess communicating with said outlet opening when said valve means is in its first position and for at least that portion of the travel of said valve means toward its second position during which said openings are in partial registry.

6. The assembly set forth in claim 1 wherein said valve means has a recess formed therein and communicating with said first opening, stop means disposed in said housing for limiting the rotational movement of said valve means between a first position wherein said first opening is in registry with said second opening and a second position wherein said openings are out of registry, said recess communicating with said outlet opening when said valve means is in its first position and for at least that portion of the travel of said valve means toward its second position during which said openings are in partial registry.

7. The assembly set forth in claim 1 wherein said sealing member is generally cup-shaped and has a planer base portion engaging said valve means and a skirt portion extending toward said inlet opening from the periphery of the base portion and engaging the walls of said housing, said second opening being formed in said base portion.

8. The assembly set forth in claim 1 and including first locating means on said sealing member and second locating means on said housing and engageable by said first locating means to orient said second opening in said sealing member relative to the first opening in said valve means and to prevent rotation of said sealing element.

9. A valve assembly including a housing having a cyclindrical bore, an inlet opening formed in said housing and in one end of said cylindrical bore, an outlet opening formed in said housing and in the side of said cylindrical bore, a rotatable valve element disposed in said bore and in generally spaced relation from inlet opening, said valve element having an outer peripheral surface complimentary with and slidably engaging the internal cylindrical surface of the bore, means for rotating said valve element about the axis of said bore, said valve element having an end face lying in a plane generally normal to said rotational axis and facing said inlet opening, a flexible sealing element disposed in said bore and between said inlet opening and said valve element, said sealing element having a first surface portion lying in a plane normal to said rotational axis and in sliding engagement with said end face, said sealing element having a peripheral surface in sealing engagement with said housing, a first opening in said valve element, a second opening in said sealing element said openings being nonconcentric relative to said rotational axis, rotation of said valve element moving said element from a first angular position wherein said first and second openings are in registry to provide a flow path between said inlet and outlet openings to a second position wherein said openings are out of registry where the existance of pressurized water at said inlet opening will act to hold the first surface of said flexible sealing element against said end face to effect a seal therebetween.

10. The assembly set forth in claim 9 wherein said sealing element is generally cup-shaped and has a planer base portion upon which said first surface portion is formed and a skirt portion extending toward said inlet opening and from the periphery of the base portion, the outer surface of said skirt portion defining said peripheral surface and engages the walls of said cylindrical bore.

11. The assembly set forth in claim 10 and including first locating means on said sealing element and second locating means on said housing and engageable by said first locating means to orient said second opening in said sealing element relative to the first opening in said valve means and to prevent rotation of said sealing element.

12. The assembly set forth in claim 11 wherein said valve element has a recess formed therein and communicating with said first opening, stop means disposed in said housing for limiting the rotational movement of said valve element between a first position wherein said first opening is in registry with said second opening and a second position wherein said openings are out of registry, said recess communicating with said outlet opening when said valve element is in its first position and for at least that portion of the travel of said valve means toward its second position during which said openings are in partial registry.

* * * * *